United States Patent
Iwabuchi et al.

(10) Patent No.: US 6,894,290 B2
(45) Date of Patent: May 17, 2005

(54) RADIATION IMAGE STORAGE PANEL

(75) Inventors: Yasuo Iwabuchi, Kanagawa (JP); Makoto Kashiwaya, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 106 days.

(21) Appl. No.: 10/259,566

(22) Filed: Sep. 30, 2002

(65) Prior Publication Data
US 2003/0075689 A1 Apr. 24, 2003

(30) Foreign Application Priority Data
Sep. 28, 2001 (JP) .......................... 2001-299934

(51) Int. Cl.$^7$ .............................................. G03B 42/08
(52) U.S. Cl. ..................... 250/484.4; 250/581; 250/582
(58) Field of Search .............................. 250/484.4, 581, 250/582, 585, 586, 584

(56) References Cited

U.S. PATENT DOCUMENTS

2001/0007352 A1 * 7/2001 Hell et al. ................ 250/484.4

* cited by examiner

Primary Examiner—David Porta
Assistant Examiner—Faye Polyzos
(74) Attorney, Agent, or Firm—Sughrue Mion, PLLC

(57) ABSTRACT

A phosphor layer of a radiation image storage panel produced by vapor phase deposition method under such condition that the phosphor layer is composed of a phosphor of a cesium chloride crystalline structure which is grown on a crystal face of (110) or (100) shows an increased sensitivity.

13 Claims, 3 Drawing Sheets

RADIATION IMAGE STORAGE PANEL

FIELD OF THE INVENTION

The invention relates to a radiation image storage panel favorably employable in a radiation image recording and reproducing method utilizing stimulated emission of a stimulable phosphor.

BACKGROUND OF THE INVENTION

When the stimulable phosphor is exposed to radiation such as X-rays, it absorbs and stores a portion of the radiation energy. The stimulable phosphor then emits stimulated emission according to the level of the stored energy when the phosphor is exposed to electromagnetic wave such as visible light or infrared rays (i.e., stimulating light).

A radiation image recording and reproducing method utilizing the stimulable phosphor has been widely employed in practice. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating light to emit stimulated light; and photo-electrically detecting the emitted light to obtain electric signals giving a visible radiation image. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as stimulable phosphor sheet) has a basic structure comprising a substrate and a stimulable phosphor layer provided thereon.

The phosphor layer is generally formed by coating a dispersion of phosphor particles in a binder solution on the substrate and drying the coated dispersion on the substrate, and therefore comprises a binder and phosphor particles dispersed therein.

It is desired that radiation image storage panels used in these methods have sensitivity as high as possible and further can give a reproduced radiation image of high quality (in regard of sharpness and graininess).

It is known that a radiation image storage panel having on a substrate a stimulable phosphor film prepared by vapor deposition (or vapor-accumulating method) such as vacuum vapor deposition or sputtering gives a reproduced radiation image with high sensitivity as well as high sharpness.

Japanese Patent Publication No. 6-77079 describes a radiation image storage panel in which a stimulable phosphor film is formed by vapor deposition to have a fine block structure.

Japanese Patent No. 3,130,632 describes a radiation image storage panel having a stimulable phosphor layer which shows a ratio of a strength $I_2$ of the second diffraction peak observed in an X-ray diffraction pattern and a strength $I_1$ of the first diffraction peak observed in the same X-ray diffraction pattern satisfying the condition of $I_2/I_1<0.3$ shows a high radiation sensitivity and gives a radiation image of high image quality. In the working examples, RbBr:Tl has a first diffraction peak $I_1$ on a (422) face, or a (220) crystal face, or a (200) crystal face.

SUMMARY OF THE INVENTION

The present inventors have studied a relationship between a phosphor layer having a cesium chloride crystalline structure such as an activated cesium chloride phosphor and its sensitivity. As a result, they have discovered that a phosphor layer of the cesium chloride crystalline structure mainly grown on the (110) or (100) crystal face shows a high sensitivity. Further, a stimulable phosphor composed of the well aligned crystals grown on the (110) or (100) crystal face gives a prominently increased sensitivity, if it is heat-treated after the vapor deposition is complete.

Accordingly, the present invention has an object to provide a radiation image storage panel showing a high sensitivity.

The present invention resides in a radiation image storage panel comprising a phosphor layer which is produced by vapor phase deposition method in which the phosphor layer comprises a phosphor of a cesium chloride crystalline structure which is grown on a crystal face of (110) or (100). In the invention, the crystal face of (100) is used to include crystal face (200), crystal face (300), and so on, that is the equivalents faces.

In the radiation image storage panel of the invention, the cesium chloride crystalline structure is preferably grown on the crystal face of (110), and a ratio of a strength of a diffraction peak observed an the crystal face of (110) in an X-ray diffraction pattern and a strength of a diffraction peak observed on a crystal face of (211) in the same X-ray diffraction pattern preferably satisfies the following condition:

$$I_{211}/I_{110}<0.4$$

in which $I_{211}$ stands for the strength of a diffraction peak observed on the crystal face of (211), and $I_{110}$ stands for the strength of a diffraction peak observed on the crystal face of (110).

Otherwise, in the radiation image storage panel of the invention, the cesium chloride crystalline structure is preferably grown on the crystal face of (100), and a ratio of a strength of a diffraction peak observed on the crystal face of (100) in an X-ray diffraction pattern and a strength of a diffraction peak observed on a crystal face of (211) in the same X-ray diffraction pattern satisfies the following condition:

$$I_{211}/I_{100}<0.4$$

in which $I_{211}$ stands for the strength of a diffraction peak observed on the crystal face of (211), and $I_{100}$ stands for the strength of a diffraction peak observed on the crystal face of (100).

DETAILED DESCRIPTION OF THE INVENTION

Figure 1:
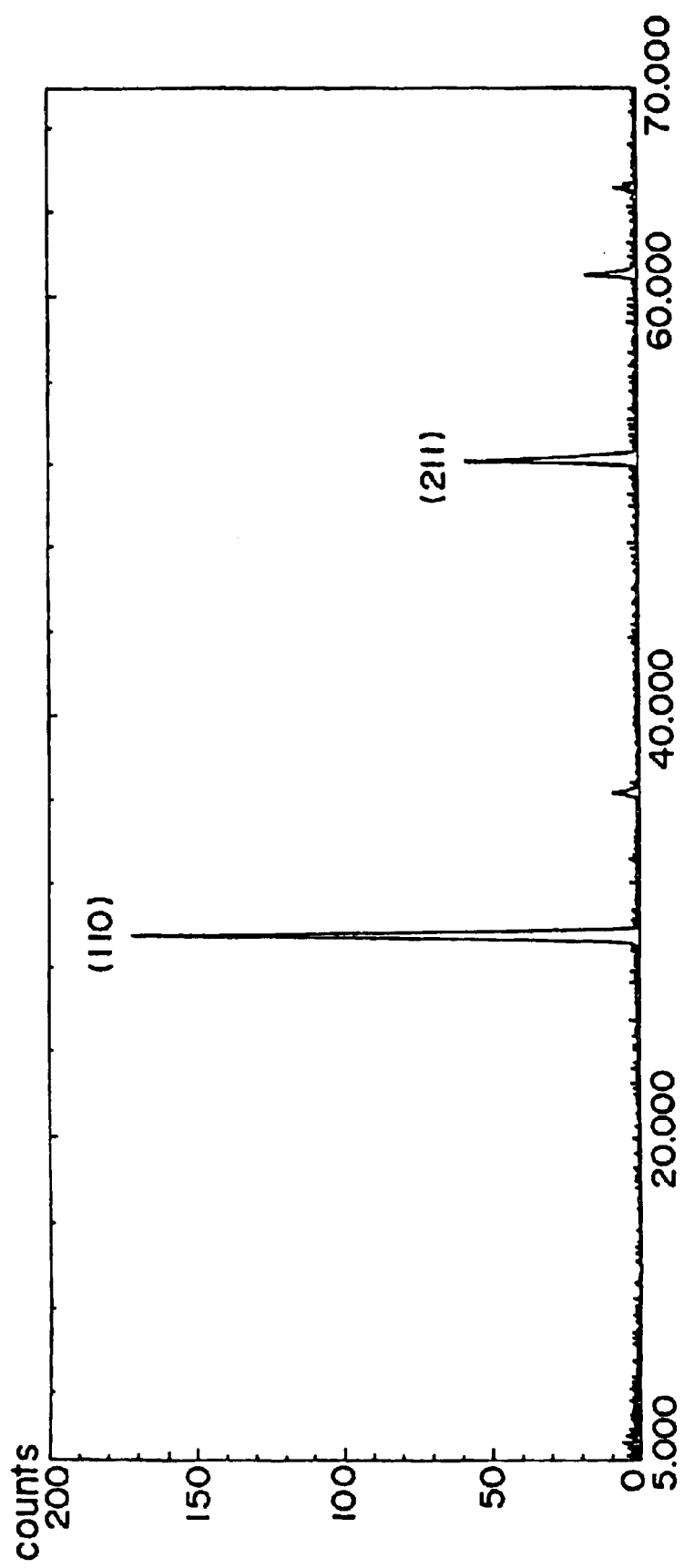
FIG. 1 shows an X-ray diffraction pattern of the phosphor layer of Example 1.

In the invention, both vapor deposition methods are preferably performed by electron beam evaporation, and the phosphor preferably is a stimulable phosphor.

The stimulable phosphor preferably is a cesium halide phosphor having the formula (I):

$$CsX \cdot aM^{II}X'_2 \cdot bM^{III}X''_3 : zA \qquad (I)$$

in which $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X is Cl, Br or I; each of X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b and z are numbers satisfying the conditions of $0 \leq a < 0.5$, $0 \leq b < 0.5$ and $0 < z \leq 1.0$, respectively. In the formula (I), z stands for a mean value of the content of the activator A in the phosphor.

In the formula (I), it is preferred that A is Eu and z satisfies the condition of $1 \times 10^{-4} \leq z \leq 0.1$.

In the case that the stimulable phosphor of the formula (I) contains an europium activator, the europium compound of the evaporation source preferably comprise a divalent europium ($Eu^{2+}$) compound and a trivalent ($Eu^{3+}$) compound. It is preferred that the europium compound contains the divalent europium compound as much as possible, at least 70%. The stimulable phosphor may contain a metal oxide such as aluminum oxide, silicon dioxide, and/or zirconium oxide in an amount of 0.5 mol or less per one mole of the Cs.

The phosphor used in the invention is not restricted to the stimulable phosphor. A phosphor giving a spontaneous emission in the ultraviolet or visible wavelength region when it absorbs a radiation such as X-ray can be also employed in the invention. Examples of these phosphors include $LnTaO_4$:(Nb, Gd), $Ln_2SiO_5$:Ce, LnOX:Tm (where Ln is a rare earth element), CsX (where X is a halogen), $Gd_2O_2S$:Tb, $Gd_2O_2S$:Pr, Ce, $ZnWO_4$, $LuAlO_3$:Ce, $Gd_3Ga_5O_{12}$:Cr, Ce and $HfO_2$.

The preparation of a radiation image storage panel of the invention is described below.

The vaporization of the evaporation source and deposition of the produced vapor can be performed in a vacuum evaporation apparatus comprising a vacuum chamber equipped with a vacuum pump, a supporting plate for evaporation source, heating means, and a supporting means for a substrate on which the vapor is to be deposited.

The evaporation source preferably is in the form of a tablet having a water content of not more than 0.5 wt %. The water content can be determined by thermogravimetric analysis in which the weight loss in the temperature range of 50 to 150° C. is measured.

Moreover, the evaporation source preferably has a relative density of 80% or more. The relative density means a value obtained by dividing a density of the evaporation source by the inherent density of the corresponding material. The evaporation source of a high relative density can be evaporated uniformly and then is effective to produce a deposited phosphor film (or layer) of a uniform thickness.

For performing the vacuum evaporation (or deposition), the evaporation source is placed directly on the supporting plate or placed in a crucible or dish which is then placed on the supporting plate. A number of evaporation sources can be employed in the vacuum evaporation. The substrate is attached to the supporting means in the position over the evaporation sources.

The substrate preferably are sheets of quartz glass, sapphire, metals (e.g., aluminum, iron, tin, chromium) or heat-resistant resins (e.g., aramide). On the substrate can be placed a light reflecting layer such as a layer containing a titanium dioxide or a light absorbing layer such as a layer containing carbon black.

On the substrate, a phosphor film is deposited. The phosphor film is preferably formed by electron beam deposition which employs electron beam to heat the evaporation source. The electron beam evaporation generally gives regularly aligned prismatic crystals having good shape.

For the preparation of the phosphor film on a substrate, it is preferred to employ two or more evaporation sources such as a combination of an evaporation source (such as in the form of tablet) comprising a matrix component and an evaporation source (such as in the form of tablet) comprising an activator component. Plural evaporation sources comprising a matrix component can be employed in the vaporization procedure. Plural evaporation sources comprising an activator component and a matrix component can be employed in the vaporization procedure.

In the process of the invention, an evaporation source or evaporation sources comprising a matrix component and a substrate on which the phosphor film is to be deposited are first set in a vacuum evaporation apparatus. The substrate is placed perpendicularly to the direction in which the vapor comes out of the source. The apparatus is then evacuated to give an inner pressure of $1 \times 10^{-5}$ to $1 \times 10^{-2}$ Pa. An inert gas such as Ar gas or Ne gas may be incorporated into the apparatus.

It is preferred that the evaporation procedure (that is, a combination of production and deposition of vapor) are performed in the vacuum chamber at a partial pressure of water of $7.0 \times 10^{-3}$ Pa or lower. It is also preferred that the evaporation procedure (that is, a combination of production and deposition of vapor) are performed in the vacuum chamber at a partial pressure of hydrocarbon of $1.0 \times 10^{-6}$ Pa or lower. The partial pressure of hydrocarbon is a value in terms of hydrocarbon of amu=55. The reduction of a partial pressure of water and the reduction of a partial pressure of hydrocarbon can be accomplished simultaneously.

In the vacuum evaporation apparatus, an electron beam generated by an electron gun is applied onto the evaporation source. The accelerating voltage of electron beam preferably is in the range of 1.5 kV to 5.0 kV. By applying the electron beam, the evaporation source of matrix component is heated, vaporized, and deposited on the substrate. The deposition rate of the matrix component generally is in the range of 0.1 to 1,000 μm/min., preferably in the range of 1 to 100 μm/min. The substrate may be cooled or heated, if needed, during the deposition process.

In the above-described vapor deposition procedure, a thin layer of well aligned prismatic crystals of matrix component is formed on the substrate. In the layer, the prismatic crystals are aligned with a space (crack) separating the adjoining prismatic crystals.

Subsequently, one or more evaporation sources of phosphor material are set in the evaporation apparatus. The evaporation sources can be replaced with a combinations of one or more evaporation sources of the matrix component and one or more evaporation sources of the activator component.

To the newly set evaporation sources is applied an electron beam in the same manner as that described above, to form, on the previously formed prismatic crystalline layer of the matrix component, a prismatic phosphor crystalline layer. In the vapor deposition, the prismatic phosphor crystals grow on the lower prismatic crystals of matrix component to give well-shaped prismatic phosphor crystals.

In the evaporation-deposition procedure, it is preferred that the substrate is heated. The crystal face (100) or (110)

is well grown on the deposited phosphor layer by adjusting the emission current to be supplied to the electron gun for applying the electron beam to the evaporation source and the temperature of the heated substrate.

After the procedure for forming the phosphor layer on the substrate is complete, the resulting layer can be subjected to heat treatment (annealing treatment).

By the above-described vapor deposition procedures, a phosphor film (or layer) comprising a prismatic phosphor layer is produced on the substrate. The phosphor film preferably has a thickness of 50 to 1,000 $\mu$m, more preferably 200 to 700 $\mu$m.

The phosphor film in which the prismatic stimulable phosphor crystals are aligned almost perpendicularly to the substrate is formed. Thus formed phosphor film comprises only the stimulable phosphor with no binder, and there are produced cracks extending the depth direction in the phosphor film.

The vacuum evaporation or deposition method is not restricted to the electron beam-evaporating method, and various known methods such as resistance-heating method, sputtering method, and CVD method can be used.

The produced phosphor film can be separated from the substrate and then placed on a different substrate.

It is preferred to place a transparent protective film on the surface of the deposited phosphor film, so as to ensure good handling of the radiation image storage panel in transportation and to avoid deterioration. The protective film preferably is transparent. Further, for protecting the storage panel from chemical deterioration and physical damage, the protective film preferably is chemically stable, physically strong, and of high moisture proof.

The protective film can be provided by coating the stimulable phosphor film with a solution in which an organic polymer (e.g., cellulose derivatives, polymethyl methacrylate, fluororesins soluble in organic solvents) is dissolved in a solvent, by placing a beforehand prepared sheet for the protective film (e.g., a film of organic polymer such as polyethylene terephthalate, a transparent glass plate) on the phosphor film with an adhesive, or by depositing vapor of inorganic compounds on the phosphor film.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film generally is in the range of about 0.1 to 20 $\mu$m (if the film is made of polymer material) or in the range of about 100 to 1,000 $\mu$m (if the film is made of inorganic material such as silicate glass). For enhancing the resistance to stain, a fluororesin layer is preferably provided on the protective film. The fluororesin layer can be form by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluororesin layer, fine particle filler may be incorporated to reduce blotches caused by interference and to improve the quality of the resultant image. The thickness of the fluororesin layer is generally in the range of 0.5 to 20 $\mu$m. For forming the fluororesin layer, additives such as a crosslinking agent, a film-hardening agent and an anti-yellowing agent can be used. In particular, the crosslinking agent is advantageously employed to improve durability of the fluororesin layer.

Thus, a representative radiation image storage panel of the invention can be prepared. The storage panel of the invention may be in known various structures. For example, in order to improve the sharpness of the resultant image, at least one of the films may be colored with a colorant which does not absorb the stimulated emission but the stimulating rays.

The present invention is further described by the following examples.

EXAMPLE 1

(1) Starting Materials

Powdery cesium bromide (CsBr, purity: 4N or higher) and powdery europium bromide (EuBr$_x$, x=approx. 2.2, purity: not lower than 3N) were employed as the starting materials. The analysis of each starting material by ICP-MS method (inductively coupled plasma spectroscopy-mass spectroscopy) revealed that each of alkali metals other than Cs (Li, Na, K, Rb) and each of alkaline earth metals (Mg, Ca, Sr, Ba) were present in the cesium bromide in amounts of less than 10 ppm and less than 2 ppm, respectively, and each of rare earth elements other than Eu and each of other elements were present in the europium bromide in amounts of less than 20 ppm and less than 10 ppm, respectively.

Since both starting materials were highly hygroscopic, they were stored in a desiccator under dry atmosphere showing a dew point of lower than −20° C., and taken out just before the following preparation was made.

(2) Preparation of CsBr Evaporation Source

The powdery CsBr (31 g) was placed in a powder molding zirconia die (inner diameter: 25 mm) and compressed in a powder molding press (Tablepress TB-5 type, NPA System Co., Ltd.) at a pressure of 40 kN, to produce a tablet (diameter: 25 mm, thickness: 15 mm). The pressure applied to the powdery CsBr was approx. 80 MPa. The produced tablet had a density of 4.2 g/cm$^3$, and a water content of 0.6 wt. %.

The tablet was dried in a vacuum drying apparatus at 200° C., for 2 hours. The dried tablet had a water content of 0.3 wt. %.

(3) Preparation of EuBr$_x$ Evaporation Source

The powdery EuBr$_x$ (x=approx. 2.2, 25 g) was placed in a powder molding zirconia die (inner diameter: 25 mm) and compressed in the powder molding press at a pressure of 40 MPa, to produce a tablet (diameter: 25 mm, thickness: 10 mm). The pressure applied to the powdery CsBr was approx. 80 MPa. The tablet was placed in a vacuum drying apparatus and heated to 200° C. for 2 hours in vacuo. The produced tablet had a density of 5.1 g/cm$^3$, and a water content of 0.5 wt. %.

(4) Formation of Phosphor Film

A synthetic quartz substrate was washed successively with an aqueous alkaline solution, purified water, and isopropyl alcohol, and then mounted to a substrate holder within an evaporation apparatus. In the apparatus, the CsBr tablet and EuBr$_x$ tablet were placed in the predetermined sites. Subsequently, the apparatus was evacuated using a combination of a rotary pump, mechanical booster, and turbo molecular pump to reach $1 \times 10^{-3}$ Pa.

In the apparatus, the substrate was heated to 200° C. by means of a sheath heater placed on the back side of the substrate. An electron beam from an electron gun (accelerating voltage: 4.0 kV) was applied onto the tablets, to deposit CsBr:Eu stimulable phosphor layer at a deposition rate of 10 $\mu$m. In the procedure of application of the electron beams, the emission currents supplied to the electron guns were controlled to 100 mA for the application to the CsBr tablet and 30 mL for the application to the EuBr$_x$ tablet, so that a molar ratio of Eu/Cs in the phosphor layer is adjusted to 0.003/1.

The surrounding gas within the evaporation apparatus was analyzed by means of mass spectrometer. The partial pressure of water in the apparatus was $4.0 \times 10^{-3}$ Pa.

After the evaporation-deposition was complete, the inner pressure was returned to atmospheric pressure, and the substrate was taken out of the apparatus. The quartz substrate having the deposited phosphor film was placed on a quartz boat and heated at 200° C. for 2 hours in the center of a tube furnace under nitrogen gas atmosphere. Before and during the heat treatment, the center of the tube furnace was evacuated by means of a rotary pump to reach approx. 10 Pa, so that water adsorbed on the deposited film would be removed. Subsequently, the substrate and the deposited film was cooled in vacuo and thus cooled substrate was then taken out of the tube furnace. On the substrate, a deposited film (thickness: approx. 400 µm, area: 10 cm×10 cm) consisting of prismatic phosphor crystals aligned densely and perpendicularly was formed.

Thus, a radiation image storage panel of the invention having a substrate and a deposited phosphor layer was prepared.

EXAMPLE 2

The procedures of Example 1 were repeated except for first vapor-depositing a CsBr crystal film (thickness: approx. 50 µm) on the substrate by applying the electron beam only to the CsBr tablet in advance of the co-deposition procedure, to give a deposited phosphor film (total thickness: approx. 400 µm, area: 10 cm×10 cm).

Thus, a radiation image storage panel of the invention having a substrate and a deposited phosphor layer was prepared.

EXAMPLE 3

The procedures of Example 1 were repeated except for first vapor-depositing a CsBr crystal film (thickness: approx. 50 µm) on the substrate by applying the electron beam only to the CsBr tablet in advance of the co-deposition procedure and for changing the emission current supplied to the $EuBr_x$ tablet to 50 mA, to give a deposited phosphor film (total thickness: approx. 400 µm, area: 10 cm×10 cm).

Thus, a radiation image storage panel of the invention having a substrate and a deposited phosphor layer was prepared.

COMPARISON EXAMPLE 1

The procedures of Example 1 were repeated except for heating the substrate to 30° C. in place of 200° C., to give a deposited phosphor film (thickness: approx. 400 µm, area: 10 cm×10 cm).

Thus, a radiation image storage panel for comparison having a substrate and a deposited phosphor layer was prepared.

COMPARISON EXAMPLE 2

The procedures of Example 1 were repeated except for first vapor-depositing a CsBr crystal film (thickness: approx. 50 µm) on the substrate by applying the electron beam only to the CsBr tablet in advance of the co-deposition procedure and for changing the emission current supplied to the $EuBr_x$ tablet to 10 mA, to give a deposited phosphor film (total thickness: approx. 400 µm, area: 10 cm×10 cm).

Thus, a radiation image storage panel of the invention having a substrate and a deposited phosphor layer was prepared.

COMPARISON EXAMPLE 3

The procedures of Example 1 were repeated except for changing the emission current supplied to the CsBr tablet to 500 mA, to give a deposited phosphor film (thickness: approx. 400 µm, area: 10 cm×10 cm).

Thus, a radiation image storage panel for comparison having a substrate and a deposited phosphor layer was prepared.

Evaluation of Radiation Image Storage Panel

Each radiation image storage panel was encased in a room light-shielding cassette and then exposed to X-rays (voltage: 80 kVp). Subsequently, the storage panel was taken out of the cassette and scanned with He—Ne laser beam (wavelength: 633 nm). The stimulated emission was detected by a photomultiplier to examine the sensitivity based on a relative value of the luminance of stimulated emission. The sensitivity is expressed in terms of a relative value.

Separately, the phosphor layer of the radiation image storage panel was subjected to X-ray diffraction analysis using an X-ray Diffraction Apparatus (produced by Rigaku Denki Co., Ltd.) to determine a ratio of strength of peak on the (211) crystal face against strength of peak on (110) crystal face, namely, first peak or a ratio of strength of peak on the (211) crystal face against strength of peak on (100) crystal face, namely, first peak.

Figure 2:
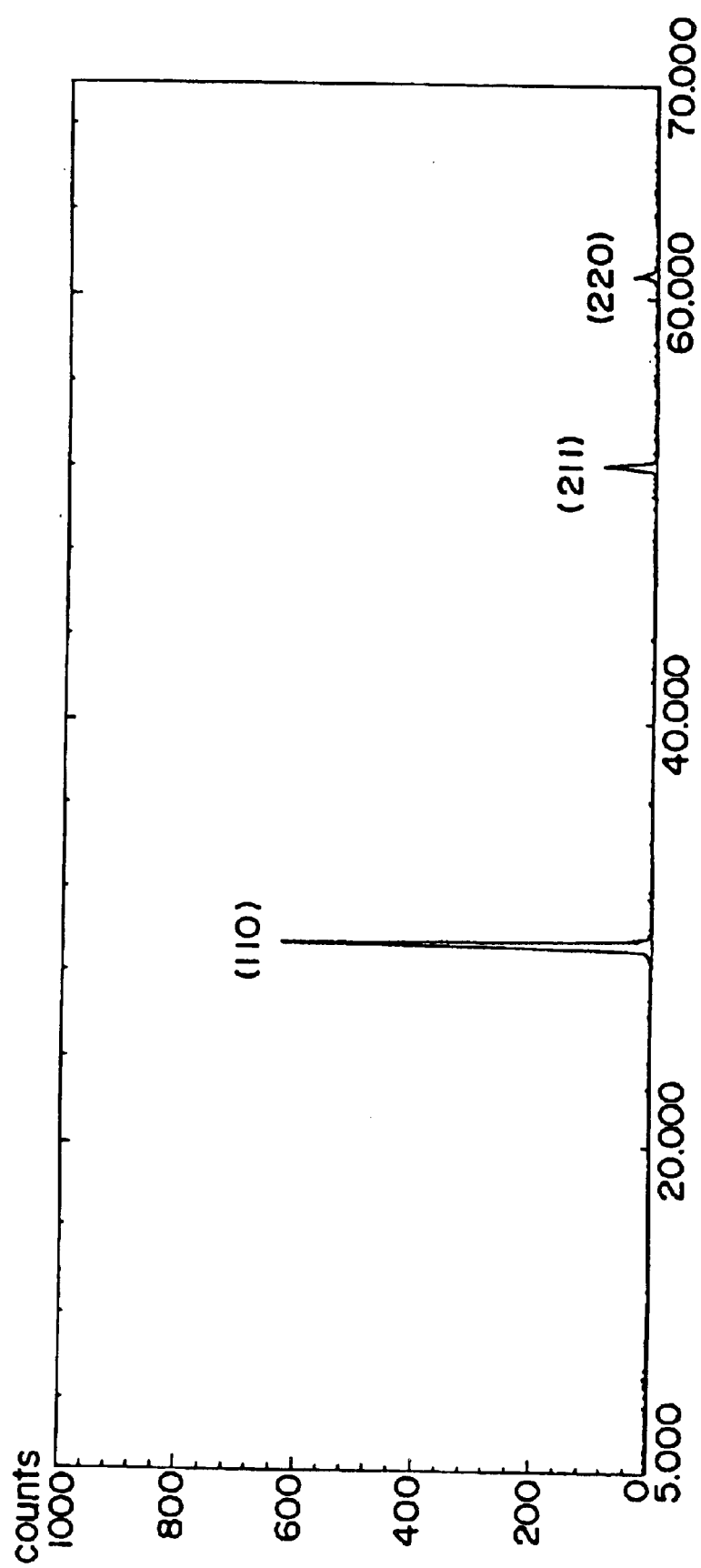
FIG. 2 shows an X-ray diffraction pattern of the phosphor layer of Example 2.
Figure 3:
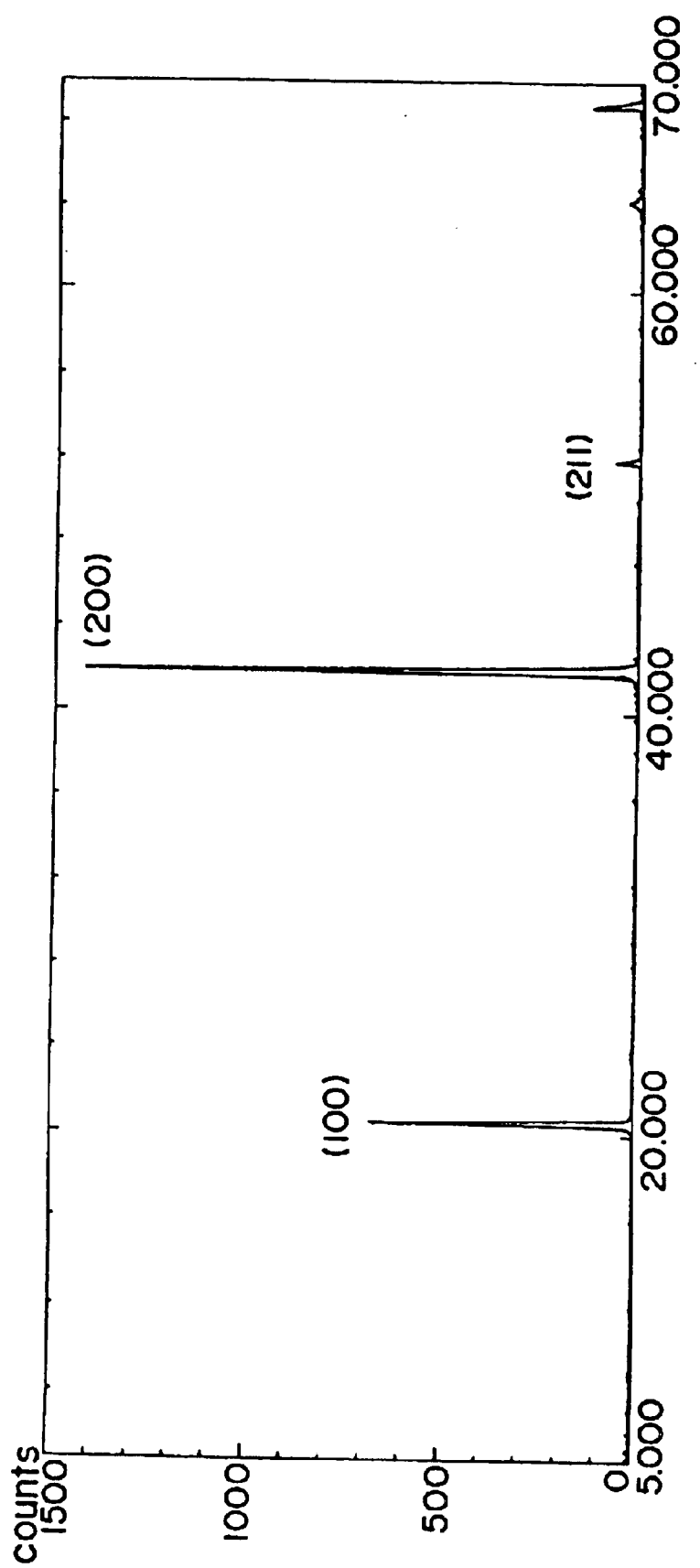
FIG. 3 shows an X-ray diffraction pattern of the phosphor layer of Example 3.

The results are set forth in FIGS. 1 to 3 and Table 1.

TABLE 1

| Example | First Peak | $I_{211}/I_{110}$(or $I_{200}$) | Eu mean concen- tration | Sensitivity Before heating | Sensitivity After heating |
|---|---|---|---|---|---|
| Ex. 1 | (110) | 0.3 | $1 \times 10^{-3}$ | 10 | 100 |
| Ex. 2 | (110) | 0.1 | $1 \times 10^{-3}$ | 15 | 120 |
| Ex. 3 | (110) | 0.15 | $1 \times 10^{-2}$ | 12 | 110 |
|  | (200) | 0 |  |  |  |
| Com. 1 | (200) | 0.6 | $1 \times 10^{-3}$ | 10 | 10 |
| Com. 2 | (110) | 0.5 | $5 \times 10^{-4}$ | 7 | 8 |
| Com. 3 | (211) | — | $1 \times 10^{-3}$ | 5 | 5 |

From the results set forth in Table 1, the radiation image storage panels having a phosphor layer showing an X-ray diffraction pattern in which the first peak appears on the (110) or (100) crystal face show apparently high sensitivity, which is further increased by the post-heat treatment.

What is claimed is:

1. A radiation image storage panel comprising a phosphor layer which is produced by vapor deposition method in which the phosphor layer comprises a phosphor of a cesium chloride crystalline structure, which is grown on a crystal face of (110).

2. The radiation image storage panel of claim 1, in which a ratio of a strength of a diffraction peak observed on the crystal face of (110) in an X-ray diffraction pattern and a strength of a diffraction peak observed on a crystal face of (211) in the same X-ray diffraction pattern satisfies the following condition:

$$I_{211}/I_{110} < 0.4$$

in which $I_{211}$ stands for the strength of a diffraction peak observed on the crystal face of (211), and $I_{110}$ stands for the strength of a diffraction peak observed on the crystal face of (110).

3. The radiation image storage panel of claim 1, in which the phosphor is a stimulable phosphor.

4. The radiation image storage panel of claim 3, in which the stimulable phosphor is a stimulable cesium halide phosphor having the following formula (I):

$$CsX \cdot aM^{II}X'_2 \cdot bM^{III}X''_3 : zA \quad (I)$$

in which $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X is Cl, Br or I; each of X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b and z are numbers satisfying the conditions of $0 \leq a < 0.5$, $0 \leq b < 0.5$ and $0 < z \leq 1.0$, respectively.

5. The radiation image storage panel of claim 4, in which A is Eu and z satisfies the condition of $1 \times 10^{-4} \leq z \leq 0.1$.

6. The radiation image storage panel of claim 1, wherein the phosphor layer is placed on a heat-resistant support sheet.

7. A radiation image storage panel comprising a phosphor layer which is produced by a vapor deposition method in which the phosphor layer comprises a phosphor of a cesium chloride crystalline structure which is grown on a crystal face of (110) or (100), the phosphor layer being heat-treated after the vapor phase deposition.

8. The radiation image storage panel of claim 7, in which the cesium chloride crystalline structure is grown on the crystal face of (110) and a ratio of a strength of a diffraction peak observed on the crystal face of (110) in an X-ray diffraction pattern and a strength of a diffraction peak observed on a crystal face of (211) in the same X-ray diffraction pattern satisfies the following condition:

$$I_{211}/I_{110} < 0.4$$

in which $I_{211}$ stands for the strength of a diffraction peak observed on the crystal face of (211), and $I_{110}$ stands for the strength of a diffraction peak observed on the crystal face of (110).

9. The radiation image storage panel of claim 7, in which the cesium chloride crystalline structure is grown on the crystal face of (100) and a ratio of a strength of a diffraction peak observed on the crystal face of (100) in an X-ray diffraction pattern and a strength of a diffraction peak observed on a crystal face of (211) in the same X-ray diffraction pattern satisfies the following condition:

$$I_{211}/I_{100} < 0.4$$

in which $I_{211}$ stands for the strength of a diffraction peak observed on the crystal face of (211), and $I_{100}$ stands for the strength of a diffraction peak observed on the crystal face of (100).

10. The radiation image storage panel of claim 7, in which the phosphor is a stimulable phosphor.

11. The radiation image storage panel of claim 10, in which the stimulable phosphor is a stimulable cesium halide phosphor having the following formula (I):

$$CsX \cdot aM^{II}X'_2 \cdot bM^{III}X''_3 : zA \quad (I)$$

in which $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; each of X is Cl, Br or I; each of X' and X" independently is at least one halogen selected from the group consisting of F, Cl, Br and I; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b and z are numbers satisfying the conditions of $0 \leq a < 0.5$, $0 \leq b < 0.5$ and $0 < z \leq 1.0$, respectively.

12. The radiation image storage panel of claim 11, in which A is Eu and z satisfies the condition of $1 \times 10^{-4} \leq z \leq 0.1$.

13. The radiation image storage panel of claim 7, wherein the phosphor layer is placed on a heat-resistant support sheet.

* * * * *